United States Patent
Wei et al.

(10) Patent No.: US 10,647,164 B2
(45) Date of Patent: May 12, 2020

(54) RADAR WEAR SENSING FOR TIRE APPLICATIONS

(71) Applicant: Bridgestone Americas Tire Operations, LLC, Nashville, TN (US)

(72) Inventors: Terence E. Wei, Copley, OH (US); Paul B. Wilson, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 447 days.

(21) Appl. No.: 15/540,631

(22) PCT Filed: Dec. 3, 2015

(86) PCT No.: PCT/US2015/063581
§ 371 (c)(1),
(2) Date: Jun. 29, 2017

(87) PCT Pub. No.: WO2016/109109
PCT Pub. Date: Jul. 7, 2016

(65) Prior Publication Data
US 2017/0361662 A1  Dec. 21, 2017

Related U.S. Application Data
(60) Provisional application No. 62/098,427, filed on Dec. 31, 2014.

(51) Int. Cl.
*B60C 11/24* (2006.01)
*B60C 23/00* (2006.01)
(52) U.S. Cl.
CPC ............ *B60C 11/243* (2013.01); *B60C 11/24* (2013.01); *B60C 23/00* (2013.01)

(58) Field of Classification Search
CPC ...... B60C 11/24; B60C 11/243; B60C 11/246
See application file for complete search history.

(56) References Cited

U.S. PATENT DOCUMENTS

| | | |
|---|---|---|
| 6,788,194 B2 | 9/2004 | Yamashita |
| 7,119,896 B2 | 10/2006 | Godeau |
| 7,180,409 B2 | 2/2007 | Brey |
| 7,204,135 B2 | 4/2007 | Robert |
| 7,343,804 B2 | 3/2008 | Liu et al. |
| 7,353,700 B2 | 4/2008 | Pullini |

(Continued)

FOREIGN PATENT DOCUMENTS

| | | |
|---|---|---|
| DE | 4326976 | 2/1995 |
| DE | 19745734 | 4/1999 |

(Continued)

OTHER PUBLICATIONS

Machine Translation: EP-0937615-A2; Seifert Franz; (Year: 2020).*

(Continued)

*Primary Examiner* — Kendra Ly

(57) ABSTRACT

A radar-based-sensing system for a tire includes a plurality of sensors disposed circumferentially around a tire annulus. Each sensor in the plurality of sensors is permanently disposed within the tire annulus. Each sensor in the plurality of sensors is further disposed radially above any metal structures within the tire annulus. Each sensor in the plurality of sensors emits waves and senses reflected waves when rotating.

7 Claims, 4 Drawing Sheets

(56) References Cited

U.S. PATENT DOCUMENTS

| | | | |
|---|---|---|---|
| 7,562,568 B2 | 7/2009 | Huang et al. | |
| 7,595,721 B2 | 9/2009 | Shinmura | |
| 7,762,129 B2 | 7/2010 | Niklas | |
| 7,775,094 B2 | 8/2010 | Awad | |
| 7,827,846 B2 | 11/2010 | Bauchot | |
| 8,061,191 B2 | 11/2011 | Hanatsuka | |
| 8,240,198 B2 | 8/2012 | Schade et al. | |
| 8,558,680 B2 | 10/2013 | Pannek | |
| 2002/0116992 A1 | 8/2002 | Rickel | |
| 2004/0159383 A1* | 8/2004 | Adamson | B60C 11/00 152/152.1 |
| 2005/0081613 A1* | 4/2005 | Hattori | B60C 11/00 73/146 |
| 2006/0090558 A1 | 5/2006 | Raskas | |
| 2007/0222614 A1 | 9/2007 | Rapp | |
| 2008/0278288 A1 | 11/2008 | O'Brien | |
| 2010/0122757 A1 | 5/2010 | Lionetti et al. | |
| 2011/0221587 A1 | 9/2011 | Katou | |
| 2012/0053849 A1 | 3/2012 | Followell | |
| 2013/0025751 A1 | 1/2013 | Dassano | |

FOREIGN PATENT DOCUMENTS

| | | | |
|---|---|---|---|
| DE | 19838638 | | 3/2000 |
| DE | 10119352 | | 11/2002 |
| DE | 10212310 | | 2/2004 |
| DE | 102007053153 | | 5/2009 |
| EP | 0937615 A2 * | 8/1999 | ............ B60C 11/24 |
| EP | 1542035 | | 6/2005 |
| EP | 0937615 | | 7/2011 |
| EP | 2743101 | | 6/2014 |
| GB | 2351564 | | 1/2001 |
| JP | 2007040705 | | 2/2007 |
| JP | 2009214773 A * | 9/2009 | |
| WO | 0240331 | | 5/2002 |
| WO | 2005039896 | | 5/2005 |

OTHER PUBLICATIONS

Machine Translation: JP-2009214773-A; ETO, Hirobumi; (Year: 2020).*

Search Report and Written Opinion; Corresponding European Application No. EP15875930; Authorized Officer Alain Gaillard; Jun. 22, 2018.

International Search Report and Written Opinion; Corresponding PCT Application No. PCT/US2015/063581; filed Dec. 3, 2015; Authorized Officer Commissioner; Apr. 1, 2016.

Ronald D. Moffitt et al.; Sensor Technologies for Direct Health Monitoring of Tires; Virginia Polytechnic Institute and State University, Institute for Advanced Learning and Research (IALR), Danville, VA, USA; http://onlinelibrary.wiley.com/doi/10.1002/9780470061626.shm028/abstract; Published: Sep. 15, 2009.

* cited by examiner

RADAR WEAR SENSING FOR TIRE APPLICATIONS

FIELD OF INVENTION

The present disclosure is directed to tires and tire treads featuring wireless sensors and tires and tire systems that use and incorporate wireless sensors. More particularly, the present disclosure is directed to tires and tire systems that sense tread wear. The tires may be pneumatic or non-pneumatic.

BACKGROUND

Known low-power, wireless sensors emit electromagnetic waves and receive reflected electromagnetic waves to approximate a distance from an object. The sensors lack a power source, and are thus used in conjunction with interrogators. The interrogators power the wireless sensors and communicate measurements to additional components within a system.

SUMMARY OF THE INVENTION

In one embodiment, a tire structure includes a first annular bead and a second annular bead. A body ply extends between the first annular bead and the second annular bead, and a circumferential belt is disposed radially above the body ply and extends axially across a portion of the body ply. A circumferential undertread is disposed radially above the circumferential belt and extends axially across a portion of the body ply. A first sidewall extends between the first annular bead and a first shoulder. A second sidewall extends between the second annular bead and a second shoulder. The first and second shoulders are associated with the circumferential undertread. An electronic device is disposed radially between the circumferential belt and a bottom tread surface such that wear does not disable or damage the electronic device. The electronic device includes an emitter configured to emit pulsed electromagnetic waves having a frequency between 30 and 300 GHz and a bandwidth between 15 and 35 ps. The electronic device also includes a receptor configured to receive reflected electromagnetic waves and a processor that compares at least one property difference between an emitted and reflected wave. The electronic device further includes a transmitter configured to transmit data to an interrogator. The electronic device observes wear over the life of the tire, at sub-millimeter resolution.

In another embodiment, a radar-based-sensing system for a tire includes a plurality of sensors disposed circumferentially around a tire annulus. Each sensor in the plurality of sensors is permanently disposed within the tire annulus. Each sensor in the plurality of sensors is further disposed radially above any metal structures within the tire annulus. Each sensor in the plurality of sensors emits waves and senses reflected waves when rotating.

In yet another embodiment, a wear-sensing radar and interrogator assembly includes a tire having a first annular bead and a second annular bead. A body ply extends between the first annular bead and the second annular bead. A circumferential belt is disposed radially above the body ply and extends axially across a portion of the body ply. A circumferential tread is disposed radially above the circumferential belt and extends axially across a portion of the body ply. A first sidewall extends between the first annular bead and a first shoulder. A second sidewall extends between the second annular bead and a second shoulder. The first and second shoulders are associated with the circumferential tread. At least one radar device is embedded in the tire, between the circumferential belt and voids in the circumferential tread. The at least one radar device emits and receives radar waves having a frequency between 90 and 100 GHz. At least one interrogator is configured to power and receive data from the at least one radar device, wherein the interrogator is not disposed on the tire.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
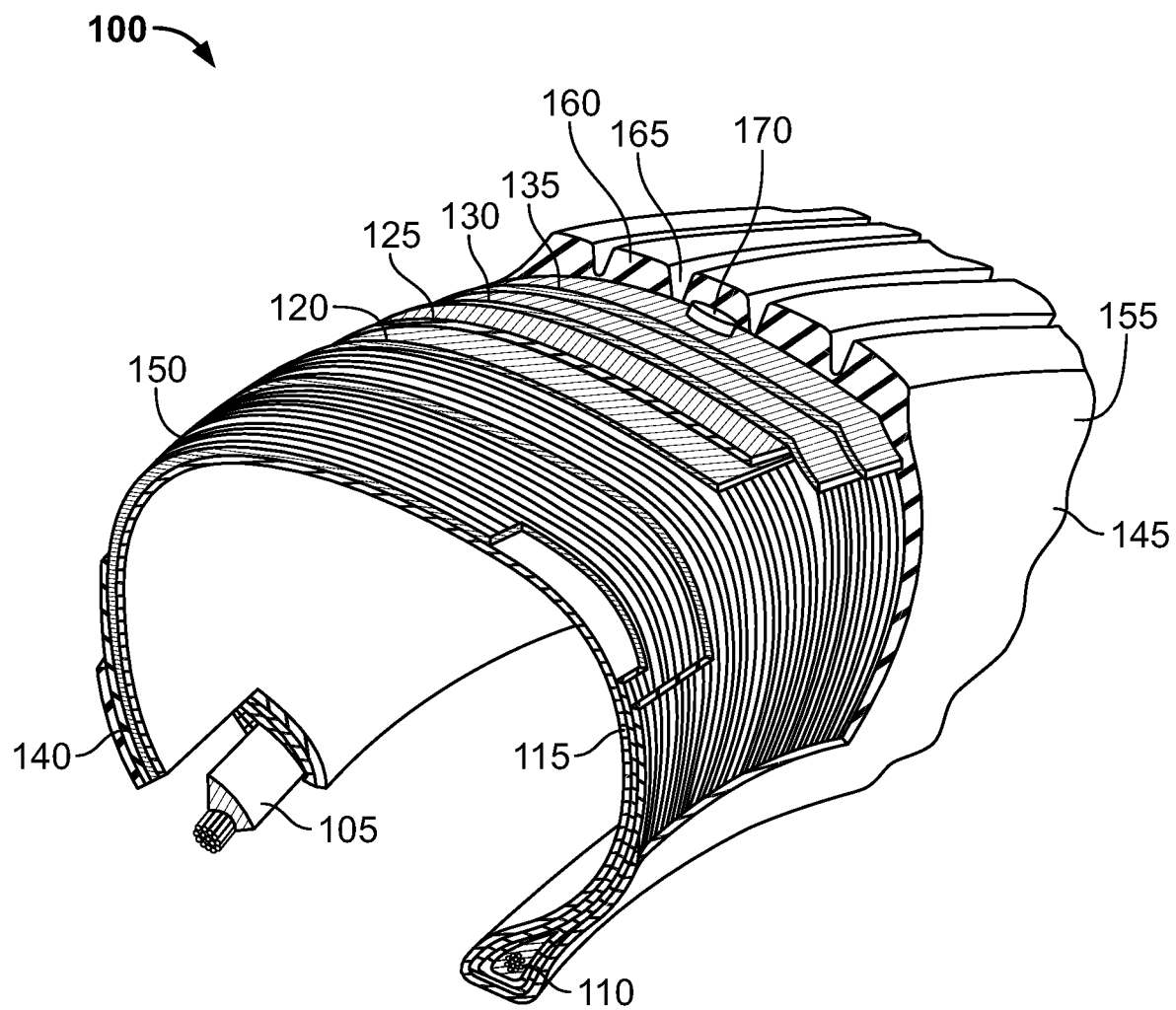
FIG. 1 is a peel-away cross-sectional perspective view of an embodiment of a tire structure.

FIG. 1 is a peel-away cross-sectional perspective view of an embodiment of a tire 100. As shown, tire 100 features a first annular bead 105 and a second annular bead 110. The annular beads, in part, secure the tire to a wheel. In an alternative embodiment (not shown), the tire comprises four or more beads.

As shown, tire 100 further features a body ply 115 extending between the first annular bead 105 and the second annular bead 110. Body ply 115 imparts shape to the tire. As one of ordinary skill in the art will understand, body ply 115 may contain reinforcing cords or fabric (not shown). In an alternative embodiment (not shown), the body ply forms a quick 2 construction.

Tire 100 further comprises a circumferential belt 120. Circumferential belt 120 is disposed radially above body ply 115 and extends axially across a portion of body ply 115. As one of ordinary skill in the art will understand, circumferential belt 120 may contain steel cords and reinforcing cords (both not shown). In an alternative embodiment (not shown), the circumferential belt lacks metal.

Tire 100 also further comprises a reinforcement ply 125. First reinforcement ply 125 is disposed radially above circumferential belt 120 and extends axially across a portion of body ply 115. As one of ordinary skill will understand, additional reinforcement plies may be utilized. The reinforcement plies strengthen and stabilize the tire. In alternative embodiments (not shown), the tire contains one or three or more reinforcement plies. In another embodiment, the reinforcement plies are omitted.

As illustrated in FIG. 1, tire 100 further comprises a cap ply 130. Cap ply 130 is disposed radially above circumferential belt 120 and second reinforcement ply 130. Cap ply 130 extends axially across a portion of body ply 115. In an alternative embodiment (not shown), a sealing gel layer is provided in the cap ply region.

Tire 100 further comprises an undertread 135. Undertread 135 is disposed radially above circumferential belt 120 and cap ply 130. Undertread 135 extends axially across a portion of body ply 115. Undertread 135 is typically comprised of rubber, and its thickness may vary depending on tire application. For instance, in retreading applications, a thicker undertread is desired to accommodate buffing. In passenger tire applications, by comparison, a thinner undertread is desired.

As shown, tire 100 further comprises a first sidewall 140 and a second sidewall 145. First sidewall 135 extends between the first annular bead 105 and a first shoulder 150, which is proximately associated with an edge of circumferential tread 160. Second sidewall 145 extends between the second annular bead 110 and a second shoulder 155, which is proximately associated with the opposite edge of circumferential tread 160. In an alternative embodiment (not shown), the sidewall is proximately associated with an undertread (not shown). With continued reference to FIG. 1, tire 100 further comprises a circumferential tread 160, which is separated by circumferential grooves 165. Circumferential tread 160 is disposed radially above reinforcement ply 125 and cap ply 130, and circumferential tread 160 extends axially across a portion of body ply 115 and between the shoulders 150, 155. In the illustrated embodiment, circumferential grooves 165 divide circumferential tread 160 into five ribs. However, it should be understood that any number of ribs may be employed. In an alternative embodiment (not shown), tread blocks form the surface of the circumferential tread. In another embodiment, lugs form the surface of the circumferential tread. In a different embodiment, a slick surface forms the surface of the circumferential tread. As one of ordinary skill in the art will understand, tires featuring a slick surface are suited for applications requiring high grip, such as an airplane or racing tire might require.

Tire 100 further comprises an electronic device 170. Electronic device 170 is disposed radially between circumferential belt 120 and the surface of circumferential tread 160. More specifically, in the particular embodiment shown in FIG. 1, electronic device 170 is disposed radially between undertread 135 and a radially inner portion of circumferential tread 160. As depicted, electronic device 170 is a cylinder, but electronic device 170 is not limited to cylindrical forms. Electronic device 170 is secured within tire 100 by vulcanization, adhesives, patches, barbs, or through other means and methods known to one of skill in the art. Because electronic device 170 is secured within the tire, it does not move within the tire. The electronic device also does not escape, eject from, or leave the tire after the initial amount of wear, and it does not intentionally cease operation when it is eroded or compromised. Thus, ordinary tread wear does not disable or damage the electronic device. In an alternative embodiment (not shown), the electronic device is disposed within the undertread. In another embodiment, the electronic device is disposed such that no metal structures are disposed between the electronic device and the tread surface. In a specific alternative embodiment, the electronic device is disposed between 5 and 15mm of an inner surface of the body ply (e.g., an innerliner).

In a retread embodiment, the electronic device is disposed between a tire casing and a retread. In retread applications, the electronic device may be resettable or rewriteable to accommodate new tread information.

As depicted, electronic device 170 is disposed under a central rib on the middle third of the tread width. However, the electronic device is not limited to a particular axial location. Thus, in an alternative embodiment (not shown), the electronic device is disposed under a circumferential groove in the circumferential tread. In another alternative embodiment, the electronic device is disposed under an outer third of the tread width. In yet another embodiment, multiple electronic devices may be employed at any locations. For example, a first electronic device may be disposed under a middle third of the tread width and a second electronic device is disposed under an outer third of the tread width. As another example, an electronic device may be disposed under each rib in a tread pattern.

In one embodiment, the electronic device comprises an emitter, a receptor, a processor, and a transmitter configured to transmit data to an interrogator.

The emitter is configured to emit pulsed electromagnetic waves having a frequency between 30 and 300 GHz and a bandwidth between 15 and 35 ps. In an alternative embodiment, the pulsed electromagnetic waves have a frequency between 90 and 100 GHz, and have a bandwidth between 20 and 30 ps. In another embodiment the pulsed electromagnetic waves have a bandwidth between 24 and 26 ps. Although not shown, the emitter has a maximum range of about 1 meter. In another embodiment, the emitter has a maximum range of about 3 meters.

The receptor is configured to receive electromagnetic waves, particularly reflected electromagnetic waves. The electromagnetic waves are emitted from the emitter, through a tire tread. The waves then reflect off a surface on which the tire rests (i.e., a road or the ground). The reflected waves are then received by the receptor. The processor then compares at least one property difference between an emitted and reflected wave. A difference between the emitted and reflected waves is calculated, and this information is sent to an interrogator. In either embodiment, a difference between the emitted and reflected wave is processed in an algorithm, which is used to calculate the distance between the sensor and the reflection surface. By extension, a remaining tread depth in a tire tread or an amount of tread wear is calculated. In this regard, the electronic device is able to observe wear of a tire tread over the life of the tire tread, at sub- millimeter resolution. This information, which can be provided in real time, may be sent through an interrogator for recordation or display.

In an alternative embodiment, the electronic device may also store tire information and history, and a processor or interrogator may look up past values for the difference between the emitted and reflected wave to calculate tread wear. Such data may be stored in a lookup table used to calculate tread wear:

In an alternative embodiment, the electronic device sensors senses rigid particulates within a tire tread. Examples of rigid particulates include, without limitation, stones, metal (i.e., nails), and glass. An alert can be generated if the electronic device detects a rigid particulate.

While a pneumatic tire is shown in FIG. 1, the RFID and antenna may also be employed in retread and non-pneumatic tire applications. The basic structures of retread and non-pneumatic tires are known in the art and are not presented here.

Figure 2:
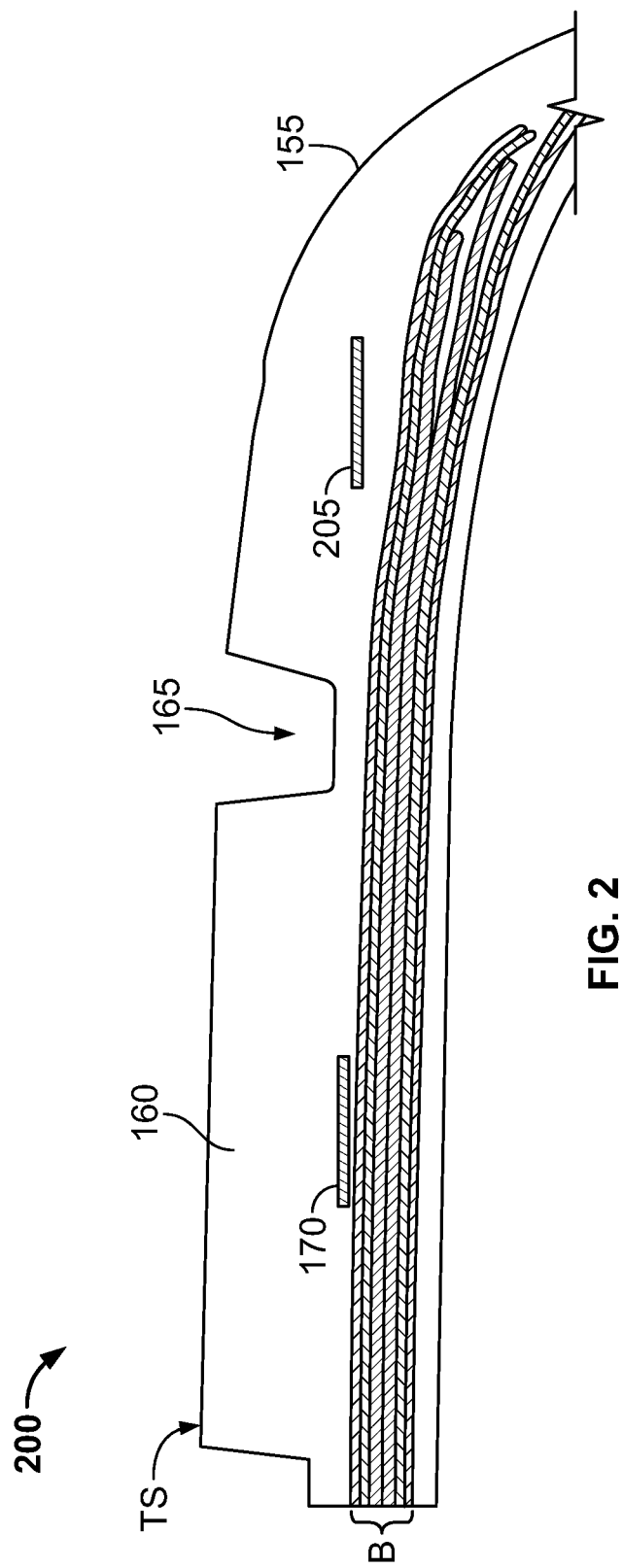
FIG. 2 is partial a cross-sectional view of an alternative embodiment of a tire structure.

FIG. 2 is a partial cross-sectional view of an alternative embodiment of the tire structure shown in FIG. 1. The embodiment illustrated in FIG. 2 is substantially the same as the embodiment depicted in FIG. 1. Accordingly, only the differences between the embodiments are discussed.

As shown in FIG. 2, tire 200 comprises a shoulder 155, a circumferential tread 160, a circumferential groove 165, an electronic device 170, a second electronic device 205, and a belt region B. The electronic devices 170, 205 are disposed radially between the belt region B and the tread surface TS of circumferential tread 160. Further, the electronic devices 170, 205 are disposed under different lateral portions of the tire (e.g., under different ribs) so that wear may be tracked across different segments of the tire. The electronic devices 170, 205 need not be disposed in a common lateral plane. It should be understood that the alternative embodiments discussed with respect to tire 100 can also be employed with tire 200.

Figure 3:
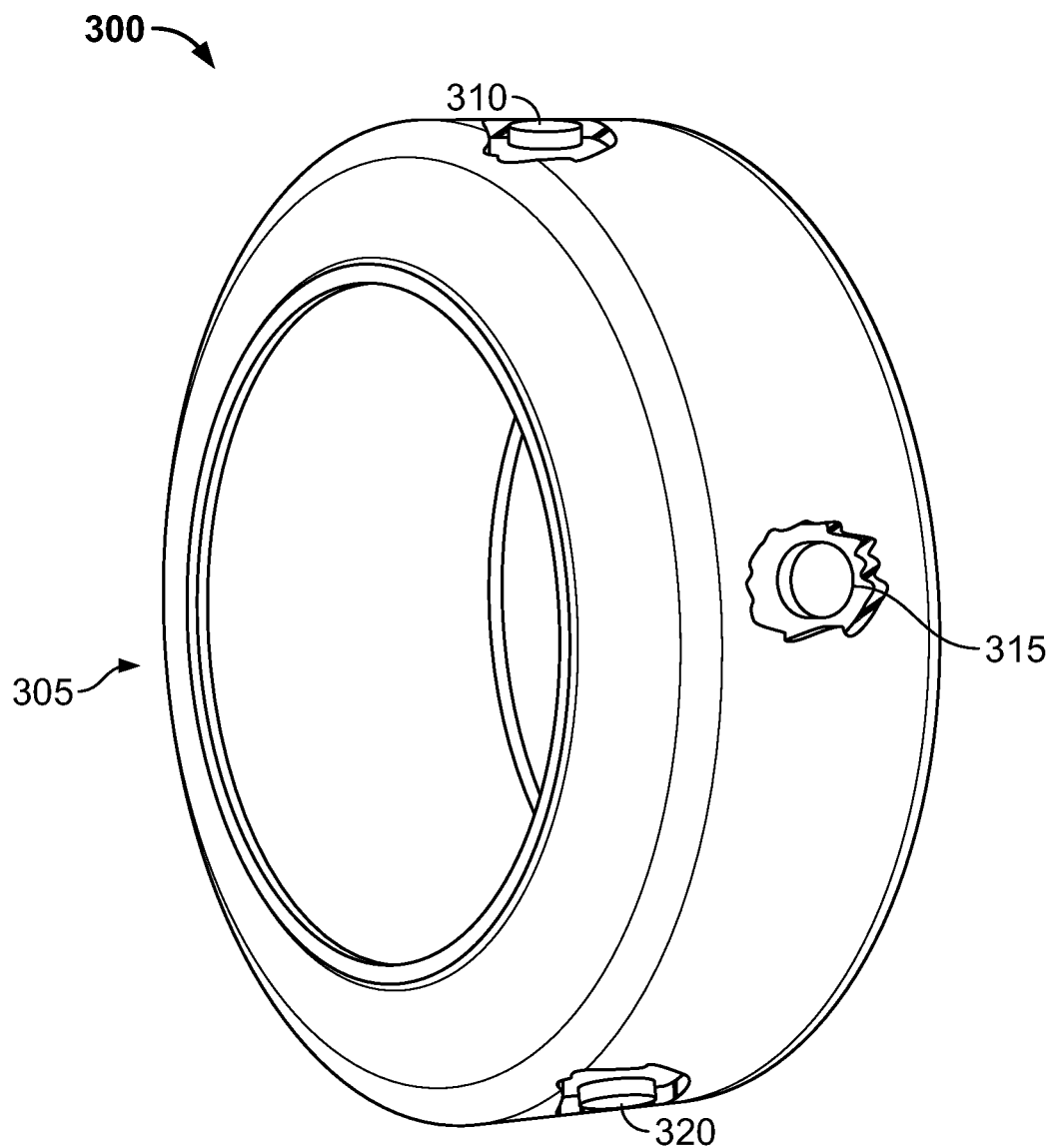
FIG. 3 is a perspective view of one embodiment of a tire system.

FIG. 3 is a perspective view of one embodiment of a tire system. Specifically, FIG. 3 shows a wear-sensing system 300 for a tire.

Wear-sensing system 300 features a tire annulus 305. As shown in FIG. 3, tire annulus 305 is a tire carcass. In an alternative embodiment (not shown), the tire annulus is a green tire carcass. In another embodiment, the tire annulus is a circumferential tread. In a different embodiment, the tire annulus is a component of a non-pneumatic tire.

Tire annulus 305 features a smooth (flat) circumferential surface. In an alternative embodiment (not shown), the tire annulus further comprises a recess that receives, partially or completely, a sensor. In another embodiment, each sensor is received by a recess.

Wear-sensing system 300 features a plurality of sensors. Specifically, FIG. 3 shows a first sensor 310, a second sensor 315, and a third sensor 320. A fourth sensor in the plurality of sensors, disposed opposite to second sensor 315 on tire annulus 305, is hidden from view. In an alternative embodiment (not shown), exactly two sensors constitute the plurality of sensors. In another embodiment, exactly three sensors constitute the plurality of sensors. In yet another embodiment, the plurality of sensors comprises at least five sensors.

As shown, the plurality of sensors is disposed radially above any metal structures within the tire annulus. In an alternative embodiment (not shown), the plurality of sensors is disposed within the tire annulus. In a different embodiment (not shown) where the tire annulus is a circumferential tread, the plurality of sensors is disposed within the circumferential tread.

As depicted, the sensors in the plurality of sensors are disposed substantially equidistantly around the tire. Thus, the sensors are spaced according to the following formula:

$$S = \frac{2\pi r}{n}$$

wherein:
S=the distance between each sensor (in m),
r=the radius of the tire annulus (in m), and
n=the number of sensors in the plurality of sensors.

In practice, it should be understood that exactly equidistant spacing may not be necessary, and sensors may be spaced within the following tolerance:

$$S = 2\pi r\left(\frac{1}{n} \pm \frac{1}{5n}\right)$$

In an alternative embodiment (not shown), the sensors are spaced according to the following formula:

$$S = 2\pi r\left(\frac{1}{n} \pm \frac{1}{20n}\right)$$

In an alternative embodiment (not shown), at least two sensors in a plurality of sensors are disposed on a common axial edge of the circumferential tread. As one of ordinary skill in the art will understand, disposing at least two sensors of a plurality of sensors along a common axial edge of the circumferential tread allows wear sensing along at least a portion of the axial edge of a tire footprint. Likewise, one of ordinary skill in the art will understand that utilizing additional, overlapping sensors allows for averaging of sensor readings. In embodiments utilizing two or more sensors, the wear sensed by both sensors can be compared, and an uneven-wear alert can be generated if the readings differ by a predetermined amount.

Figure 4:
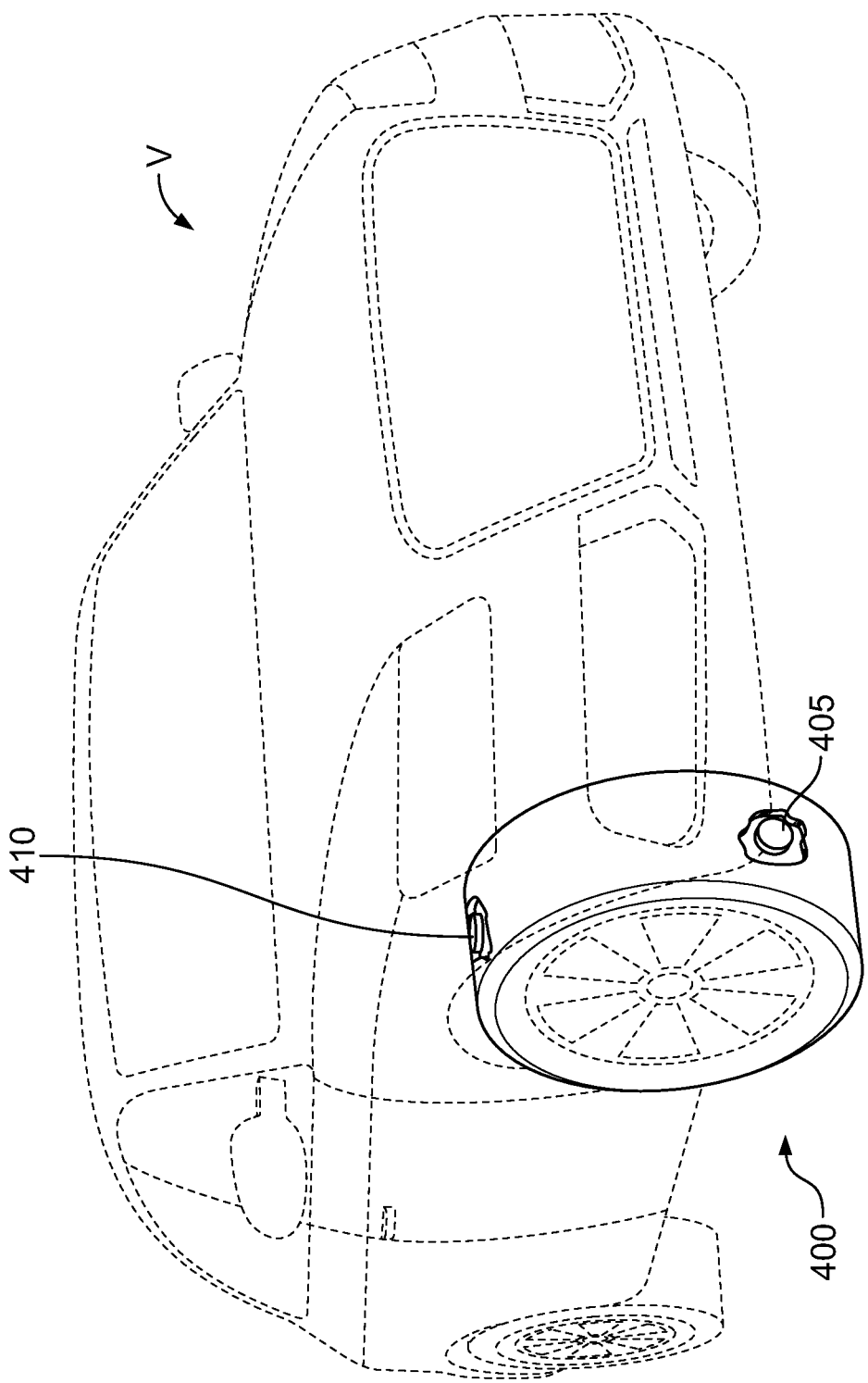
FIG. 4 is a perspective view of radar and interrogator assembly.

FIG. 4 is a perspective view of radar and interrogator assembly 400. Assembly 400 comprises at least one radar sensor 405 and at least one interrogator 410. The radar sensor 405 is disposed within the front right tire of vehicle V. In an alternative embodiment (not shown), at least one radar sensor is disposed within each tire of the vehicle. In a different embodiment, two or more radar sensors are disposed on a fraction of the tires on the vehicle.

Interrogator 410 powers radar sensor 405 and communicates with additional components. Examples of additional components include, without limitation, vehicle V, a computer, a phone, a tablet, or other electronic device.

As depicted, interrogator 410 is disposed in a wheel well of vehicle V. In an alternative embodiment (not shown), the interrogator is disposed on a vehicle location selected from the group consisting of an axle, a wheel, and a wheel well. In another embodiment, the interrogator is a hand-held device. In a different embodiment, the interrogator is disposed on a vehicle path on which vehicles are driven. Examples of vehicle paths include, without limitation, driveways, garage entrances, gas stations, service stations, toll booths, and weigh stations. The interrogator may be disposed on a post, a pad (over which a vehicle is driven), or secured to an existing structure.

Although not shown, the radar sensor emits and receives radar waves having a frequency between 90 and 100 GHz. In another embodiment, the radar sensor emits and receives radar waves of a frequency between 92 and 95 GHz.

Although not shown, the radar sensor emits has an emission range limit of about 1 meter. In another embodiment, the radar sensor emits has an emission range limit of about 3 meters.

Information from the interrogator or a component that has communicated with the interrogator may be sent to various destinations. Exemplary destinations include, without limitation, a vehicle, the electronic devices discussed above, a database, an original equipment manufacturer (such as a vehicle or tire manufacturer). As one of ordinary skill in the art will understand, the data may be used for predictive maintenance, warning systems, or quantitative analysis of tire performance.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized, without limitation, in high-performance, winter, all-season, touring, non-pneumatic, and retread tire applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire structure comprising:
a first annular bead and a second annular bead, a body ply extending between the first annular bead and the second annular bead, a circumferential belt disposed radially above the body ply and extending axially across a portion of the body ply, a circumferential undertread disposed radially above the circumferential belt and extending axially across a portion of the body ply, a first sidewall extending between the first annular bead and a first shoulder, the first shoulder being associated with the circumferential undertread, a second sidewall extending between the second annular bead and a second shoulder, the second shoulder being associated with the circumferential undertread, and an electronic device disposed radially between the circumferential belt and a bottom tread surface such that wear does not disable or damage the electronic device, wherein the electronic device includes:
an emitter configured to emit pulsed electromagnetic waves having a frequency between 30 and 300 GHz and a bandwidth between 15 and 35 ps;
a receptor configured to receive reflected electromagnetic waves;
a processor that compares at least one property difference between an emitted and reflected wave; and
a transmitter configured to transmit data to an interrogator, wherein the electronic device observes wear over the life of the tire, at sub-millimeter resolution.

2. The tire structure of claim 1, wherein the emitter is embedded within the circumferential undertread.

3. The tire structure of claim 1, wherein the emitter is disposed on a radially outer surface of the circumferential undertread.

4. The tire structure of claim 1, wherein the emitter is resettable.

5. The tire structure of claim 1, wherein real time data from the emitter is sent to a vehicle for recordation or display.

6. The tire structure of claim 1, wherein the emitter is disposed within a circumferential tread, the circumferential tread being disposed radially above the circumferential undertread and extending axially across a portion of the body ply.

7. The tire structure of claim 1, wherein the tire structure further comprises a second emitter disposed radially above the circumferential belt.

* * * * *